United States Patent [19]
Zwosta

[11] Patent Number: 4,627,324
[45] Date of Patent: Dec. 9, 1986

[54] METHOD AND INSTRUMENT FOR GENERATING ACOUSTIC AND/OR VISUAL EFFECTS BY HUMAN BODY ACTIONS

[76] Inventor: Helge Zwosta, Görresstrasse 2, D-8902 Neusäss, Fed. Rep. of Germany

[21] Appl. No.: 745,163

[22] Filed: Jun. 17, 1985

[30] Foreign Application Priority Data

Jun. 19, 1984 [DE] Fed. Rep. of Germany ....... 3422737

[51] Int. Cl.[4] ........................ G09B 15/04; G10H 1/00
[52] U.S. Cl. ...................................... 84/1.01; 84/1.24; 84/464 R; 84/477 R
[58] Field of Search ................... 84/1.01, 1.24, 464 R, 84/464 A, 477 R, 477 B, 478, 479 R, 479 A

[56] References Cited

U.S. PATENT DOCUMENTS

| | | | |
|---|---|---|---|
| 3,704,339 | 11/1972 | Niinomi | 84/1.24 |
| 3,705,948 | 12/1972 | Tomisawa | 84/1.24 |
| 4,043,241 | 8/1977 | Liu | 84/1.01 |
| 4,226,154 | 10/1980 | Easler | 84/1.01 |

*Primary Examiner*—S. J. Witkowski
*Attorney, Agent, or Firm*—Armstrong, Nikaido, Marmelstein & Kubovcik

[57] ABSTRACT

A method and apparatus for generating acoustic or visual effects by human body actions, including transducer for generating electrical signals upon influence of human body actions attached to various portions of the human body and, upon a dancing movement and/or rhythmic touching of at least one of the transducers, signal generating means are selectively activated via a logic means for driving predetermined means for creating acoustic and/or visual effects.

19 Claims, 15 Drawing Figures

Fig. 4a
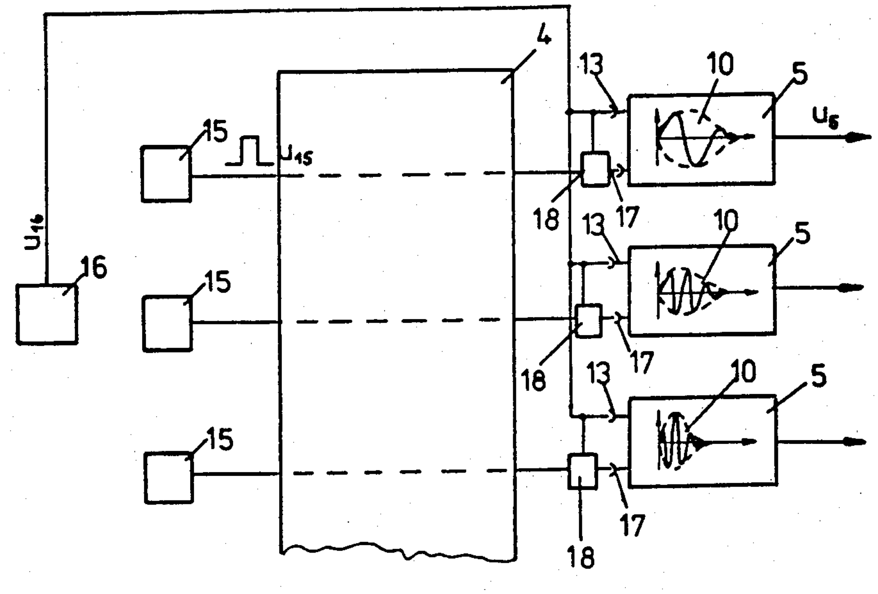
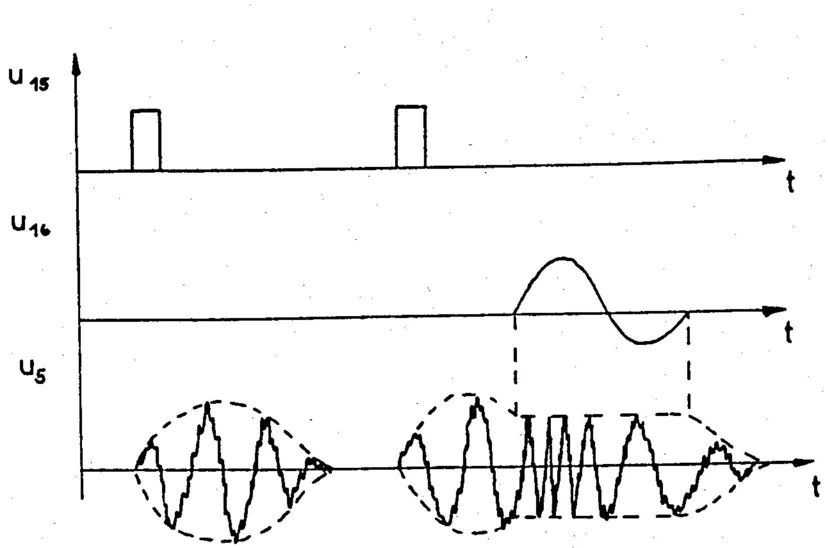
Fig. 4b

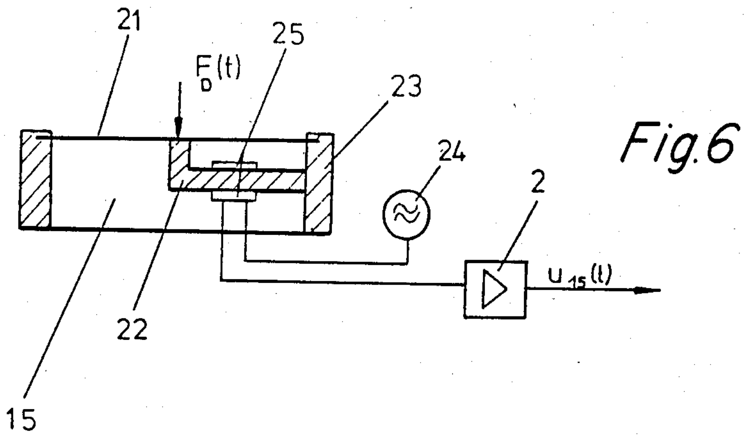
Fig.6
Fig.7a
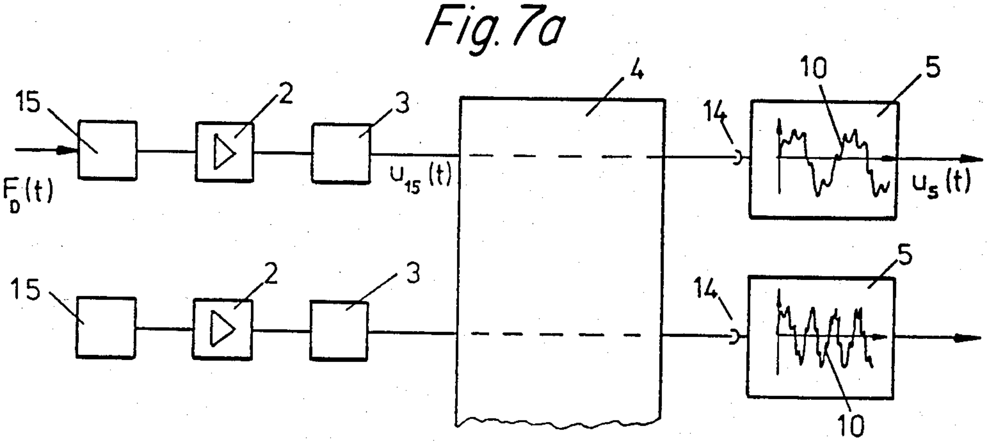
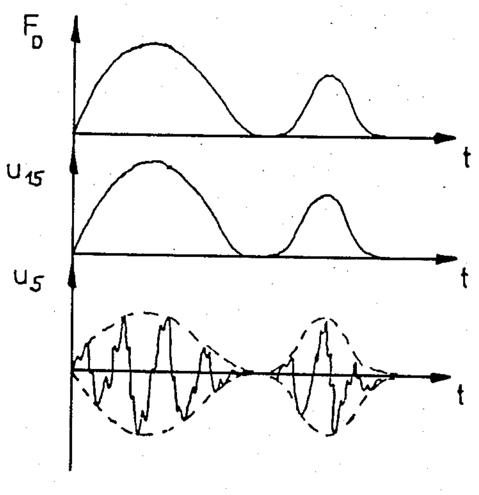
Fig.7b

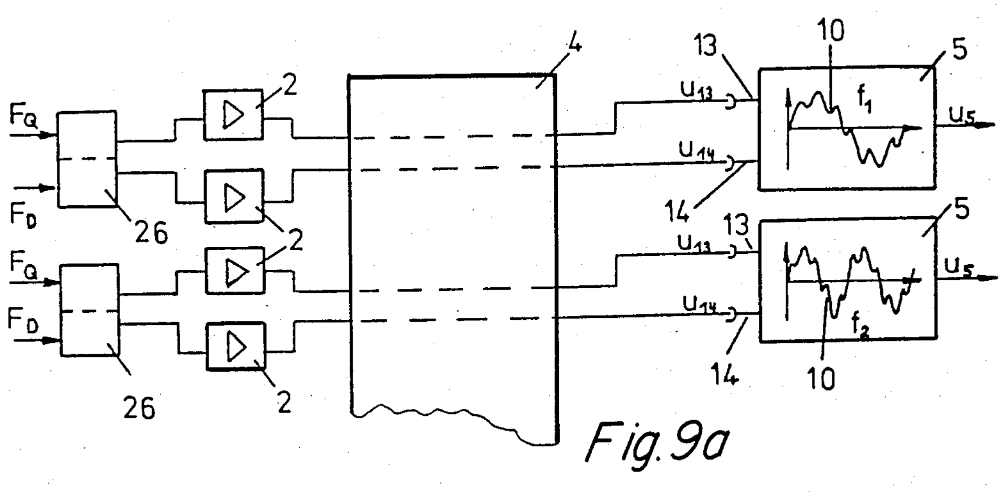
Fig. 9a
For FQ = 0
Fig. 9b
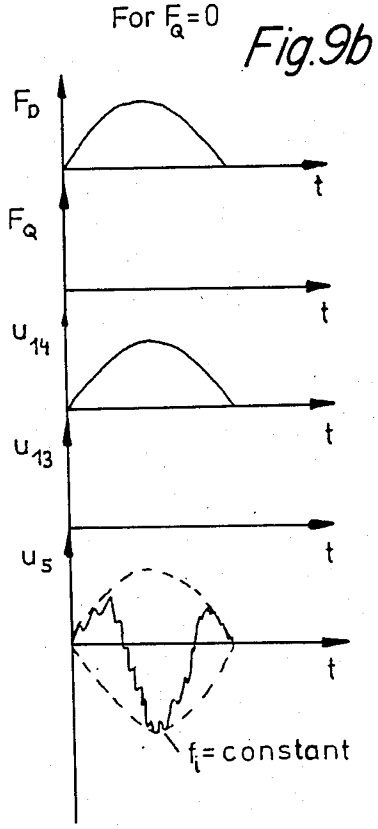
For FQ ≠ 0
Fig. 9c
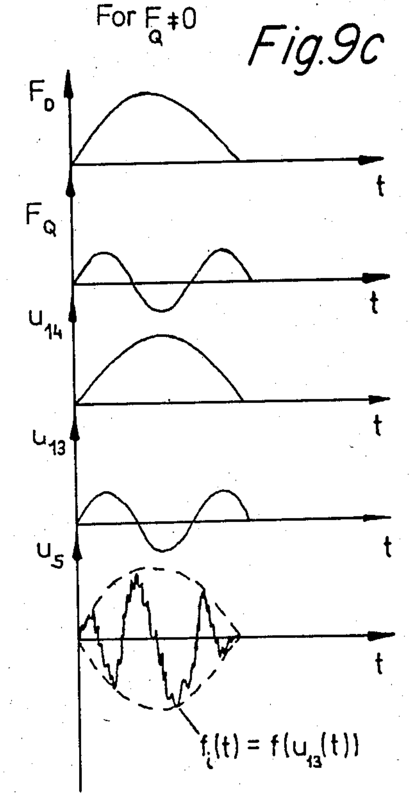
f1, f2, fi = Frequency

METHOD AND INSTRUMENT FOR GENERATING ACOUSTIC AND/OR VISUAL EFFECTS BY HUMAN BODY ACTIONS

BACKGROUND OF THE INVENTION

The invention relates to generating acoustic and/or visual effects by human body actions.

In connection with pop music performances there are two types of trends. The one is using of modern electronic for generating amplyfying and varying musical sounds while the other is uses show effects. For generating musical sounds conventionally musical instruments of considerable sizes are used. This means, that the musicians have to carry large instruments, such as trumpets or guitars, or are bound to the location where the instrument has been placed. Furthermore, sound generation generally necessitates specific finger action for playing the instrument.

SUMMARY OF THE INVENTION

It is an object of the invention to eliminate need for voluminous instruments.

It is an further object of the invention to generate acoustic and/or visual effects by human body actions.

These and other objects are achieved by a method and an instrument as defined in the appended claims.

The term "human body actions", as used herein, means any movements, in particular dancing movements of the human body, or parts thereof, as well as approaching or touching one or a plurality of transducers provided at the surface or skin of the human body in a particular rhythmic manner. The type of transducer determines which type of action is converted into electrical signals. For instance, a fast movement of an arm may result in the generation of an electrical signal by an acceleration transducer attached to the arm while a rhythmic touching of a pressure sensitive transducer attached to the thigh may result in a different electrical signal. The transmission of the transducer signals, from the human body to signal generators, may be accomplished by an electric cable or wireless i.e. by an electromagnetic or supersonic transmitter/or receiver system.

By the term "signal generator" as used herein, is meant any circuit which, upon excitation, generates any type of characteristic signals. Such signals may have a sinusodial wave, a square wave or any other functional wave form and may be a certain timbre, or sound quality, having a characteristic signal. A characteristic signal may for example be the sound of the note $c^1$ of a piano.

The implementation of generating a certain timbre, or sound quality may be accomplished by different methods known in the art, for instance, by a master generator followed by a frequency divider using a master signal, having a saw tooth or square wave form, and by using appropriate filters in order to achieve the desired timbre or sound quality. Alternatively, each sound of a certain timbre may be digitally stored. In view of the variety of implementations of signal generators, signal generators are shown in the drawing in block form with characteristic outputs.

Generally, according to the invention, any desired number of transducers are attached to the human body which transducers cause characteristic electrical signals to be generated upon characteristic human body actions. The characteristic electrical signals are transmitted to signal generators via a logical circuitry. The signal generators provide electrical signals associated with the human body actions and are transmitted to electro/acoustic and/or electro/visual converting means.

Selecting switches attached to the human body and connected to the transducers enable the person to provide a desired signal characteristic for any one or several of the transducers. For instance, the timbre of a piano may be associated with all transducers attached to the right arm of the person while the timbre of a trombone may be associated with all transducers attached to the left arm.

With any desired number of transducers being movement sensitive, such transducers will cause signals depending on dancing or rhythmic body movements. Such movement sensitive transducers may, preferably, operate by using a seismic mass vibrating, upon being moved, in conneciton with an inductance coil in a magnetic field and result in inducing an electric voltage. Alternatively, transducers may operate according to a piezoresistive principle, using a strain gauge having a cantilever provided with vibrating mass, or according to the piezocapacitive principle using a piezoquartz provided with the vibrating mass.

Further selecting means may be provided connected to the transducers and selectively applying the signals generated by the transducers to frequency and/or amplitude modulation inputs of the signal generators.

This results in amplitude and/or frequency variations of the characteristic signals generated by the signal generators is dependent on human body actions. Thus, in dependance of body movements acoustic pitch and/or volume variations and/or light effect variations may be accomplished.

Furthermore, any desired number of transducers may be designed as electric or magnetic or optical touch or approachment transducers or as pressure sensitive transducers. Consequently, by moving a part of the body, for instance a finger, towards a transducer or touching it or pressing against it, once or several times in sequence, respective sequences of acoustic or visual effects may be generated.

A distortion sensor may be another type of transducer causing a frequency variation in the characteristic signals generated by body movement which leads to distortion effects in sounds generated.

Such a distortion sensor may be designed as a rotational or linear potentiometer. Alternatively, it may comprise a movement sensitive transducer explained above causing the distortion effect exemplary by rhythmic arm movements.

A hold sensor attached to the body which upon excitation causes the most recently generated sound sequence to be maintained as long as the hold sensor stands actuated.

The selecting means for the signal characteristic, the frequency and/or amplitude modulation and the sound and hold sensors may comprise electrical diaphragm or miniature touch means or resistive or capacitive touch means.

Alternatively, the sound sensor may be based on the piezoresistive principle using a strain gauge and a resistive element or on the piezocapacitive principle using a piezoquartz and a capacitor. Using these principles will a result in an electrical signal generation proportional to a pressure excerted upon the transducers.

Specifically, a thin pressure sensitive foil may be used as a pressure sensitive element in the various transducers.

A pressure sensitive electrical signal, applied to the amplitude modulation input of a signal generator having a characteristic signal output, will result in the shaping of the envelope of the outputted signal such that a short hard actuation will cause a loud short sound signal whilst a long weak actuation will lead to a gentle long sound signal.

A sound sensor may be combined with a distortion sensor to one integral unit based, again, on the piezoresistive or piezocapacitive principle. Such a unit may be designed so that, upon pressure actuation in one direction and independent thereof upon force actuation perpendicular to the pressure actuation, proportional electrical signals are generated.

Now, if the pressure dependent electrical signals are applied to the amplitude modulation input and the lateral force dependent electrical signals are applied to the frequency modulation input of a signal generator, a pressure actuation by a finger causes the generation of a sound having a pressure proportional envelope, whilst a rhythmic lateral movement of the finger causes a frequency distortion of this sound.

All transducers selecting means, as well as the logical circuitry, and the electric connection circuitry may be preferably implemented in the form of an integrated circuit and may be attached either to the human skin or to the surface of a cloth or into the lining of a cloth.

When using the invention musical performers need not carry a musical instrument and are not bound to the location of the instrument. Furthermore, any dancing movement may be converted into sounds and/or light effects.

BRIEF DESCRIPTION OF THE DRAWINGS

FIG. 4A is a further embodiment of the present invention using sound sensors and distortion sensors;

FIG. 4B and shows the signal wave forms of the embodiment of FIG. 4A;

FIG. 6 is a schematic view of a sound sensor operating according to the piezoresistive principle;

FIG. 7A is a schematic block diagram of still another embodiment of the present invention using pressure sensitive transducers;

FIG. 7B shows the signal wave forms of the embodiment of FIG. 7A;

FIG. 9A is a schematic block diagram for explaining the operation of an apparatus according to the invention using combined sound and distortion sensors according to FIG. 8; and, FIGS. 9B & 9C shows the signal wave forms using combined sound and distortion sensors.

DESCRIPTION OF PREFERRED EMBODIMENTS OF THE INVENTION

Figure 1:
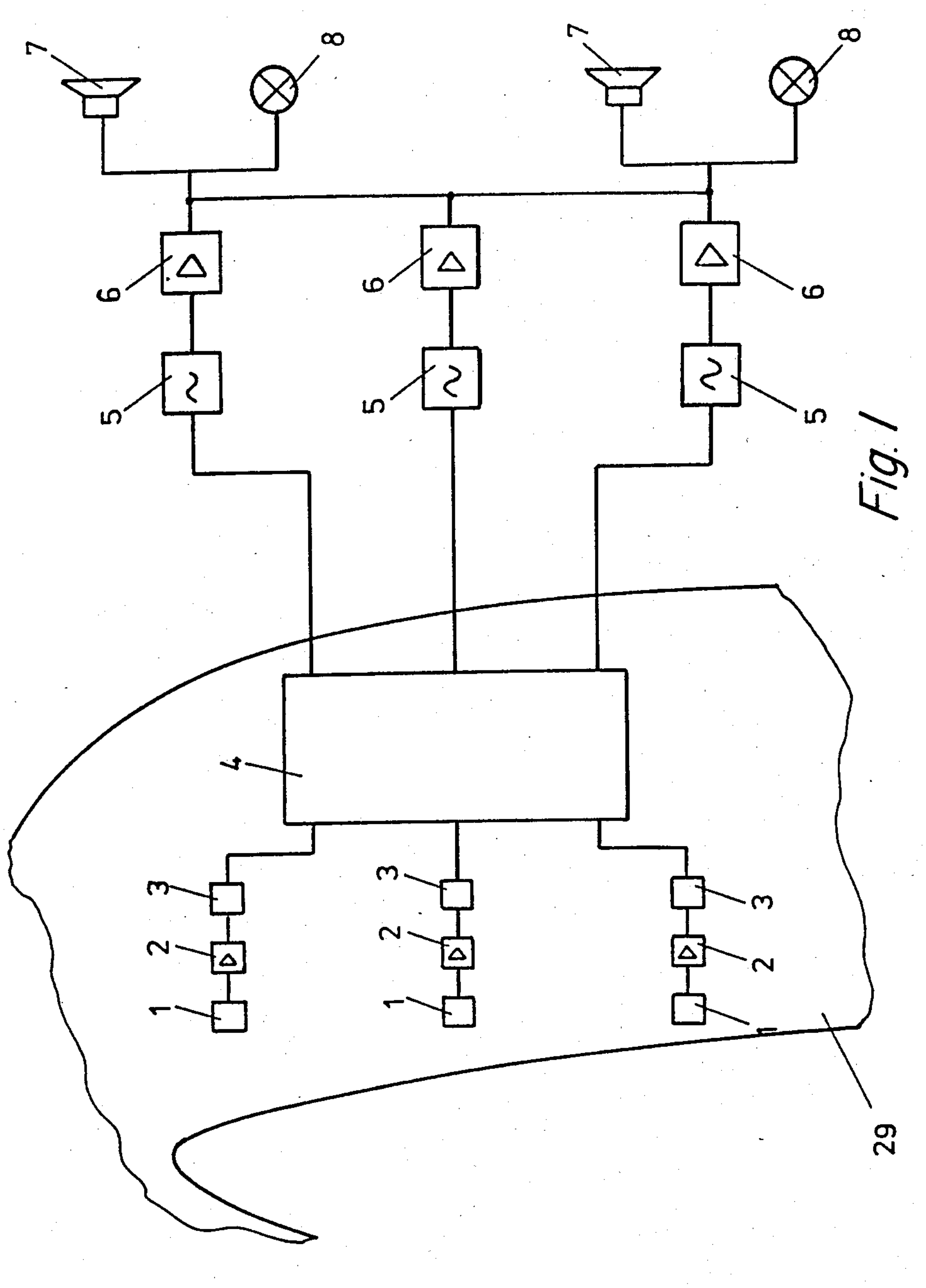
FIG. 1 shows a principle scheme of attaching transducers to the human body.

FIG. 1 shows, in principle, the arrangement of electrical transducers 1 on a human body 29 together with other associated basic circuitry. The electric transducers may be designed according to various functional principles. Thus, some of the transducers may be designed in order to output electrical signals upon movement; while other of the transducers may be designed to generate electrical signals upon touching or approaching them. Thus, the transducers generate electrical signals both upon dancing movements and rhythmic touching them, i.e. upon body actions. Depending upon the design of the transducers, it may be necessary to apply the electric signals generated by them to an amplyfier 2 followed by an electric converter 3. The requirements for amplifying and converting of the signals, outputted by the transducers, will depend on the type of transducer and the power necessary for exciting signal generators 5. Therefore, in principle, it may be possible to omit the amplyfiers 2 and the electric converters 3 or it may be preferably to include them into the circuitry at the output of a logic matrix 4. This logic matrix 4 determines which transducer is to be connected to which signal generator 5. Upon any body action, those transducers, excited by such a body action, generate signals which, if desired, are amplified and converted and are applied to the logic matrix 4. The logic matrix 4 directs, in a predetermined pattern, the signals to various signal generators 5 which output a characteristic signal, each associated to the specific body action.

Such a characteristic signal may exemplary be a sinusodial, or square wave form or a voltage/time-function resulting from super-position of several sinus wave forms. The signal generated by the signal generators 5 is applied, preferably via an amplifier 6, to an electro-acoustic means 7, preferably a loud speaker, and/or to an electro-visual means 8, for instance a light show.

Figure 2:
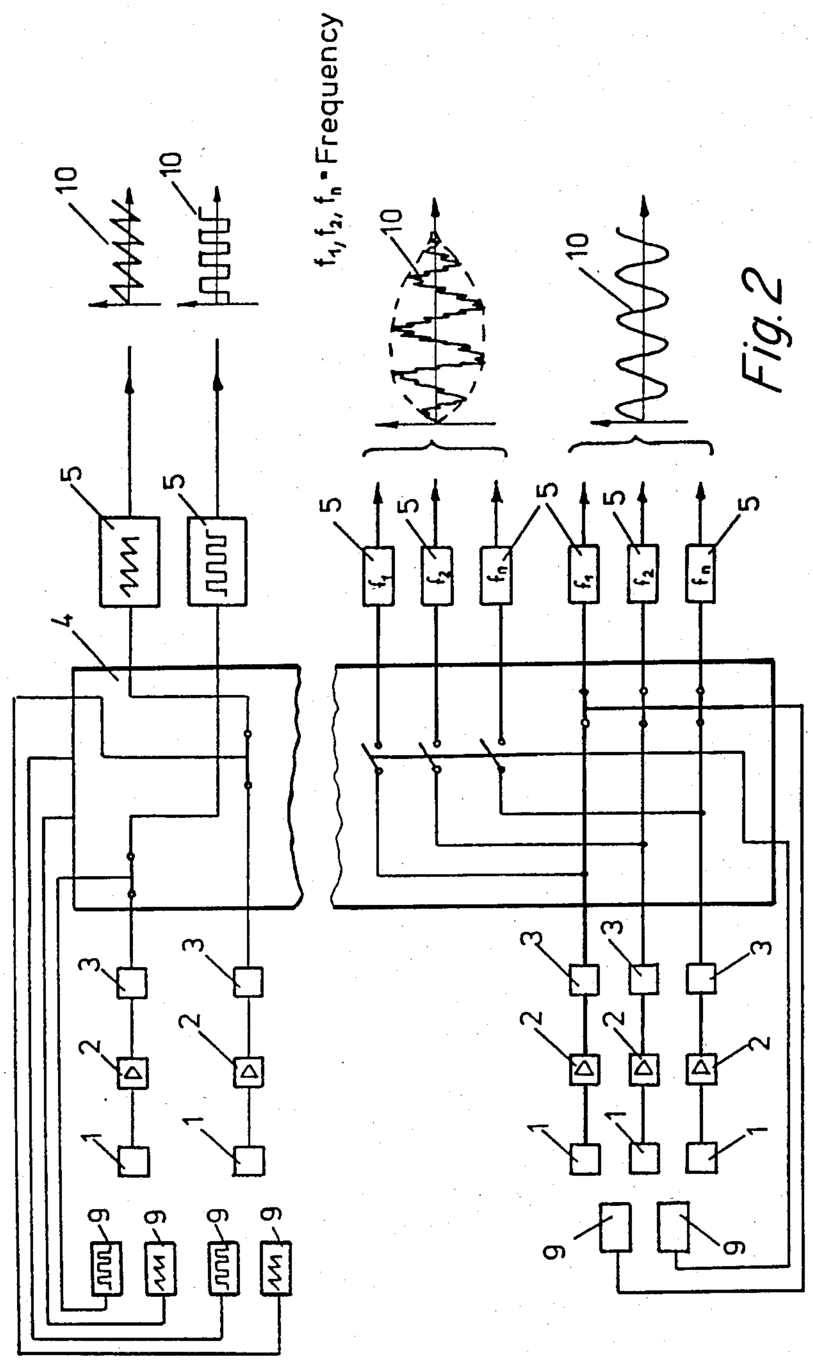
FIG. 2 shows a schemataic diagram of one embodiment of the present invention for allocating certain signal characteristics to one or several transducers.

FIG. 2 shows an embodiment enabling the person, to whom the transducers are attached, to determine the signal characteristics of one or several transducers 1.

In addition to the circuitry according to FIG. 1, selecting means, preferably selecting switches 9 are attached to the human body. By operating the selecting switches 9, the logic matrix 4 may be controlled, in such a manner, that a specific signal generator 5, outputting a characteristic signal 10, is associated with a predetermined transducer 1. Thus, the person carrying the instrument may select whether a transducer 1 attached to his right leg will cause a saw tooth or square pulse upon body action. Furthermore, he may select whether a group of transducers 1 will output signals having the timbre of a piano or a flout upon a body action, in particular, a touching action. In this case, the transducers will be connected, via the logic matrix 4 to the signal generators 5 in such a manner that each transducer 1 is connected to a signal generator 5 of a predetermined frequency and/or timbre. Normally, the logic matrix 4 will be an integrated circuit including the corresponding logical circuitry. For explanation purposes only the logic matrix 4 is shown including switches in FIG. 2.

Figure 3A:
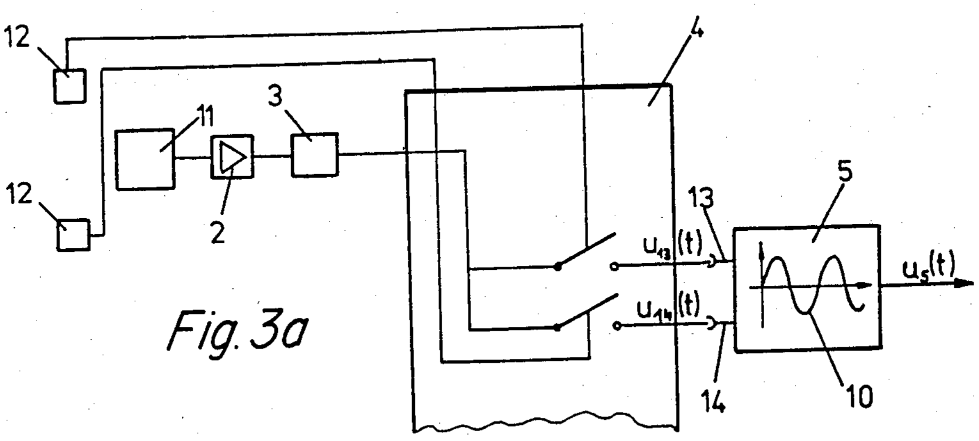
FIG. 3A is a block diagram of a particular embodiment of the instant invention for converting body actions into frequency and/or amplitude modulated signals.
Figure 3B:
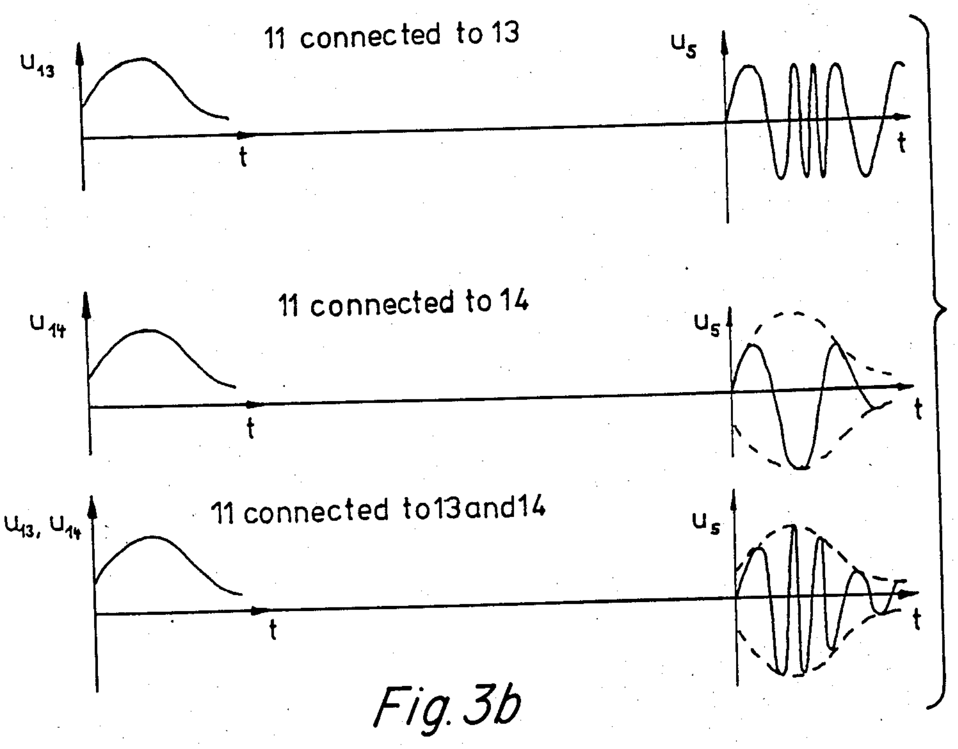
FIG. 3B shows the signal wave forms of the block diagram of FIG. 3A.

FIG. 3 shows a circuit arrangement and associated signal wave forms, of a specific embodiment, where the attaching of movement sensitive transducers 11, at the human body, causes a conversion of the body movement into frequency and/or amplitude modulated signals.

According to the art, the signal generator 5 is provided with a frequency modulation input 13 and an amplitude modulation input 14. By means of selecting switches 12, attached to the body, a person may select whether the signals of the movement sensitive transducers 11 are applied to the frequency modulation input 13 and/or the amplitude modulation input 14 of the signal generator 5.

In this case the selecting switches 12 are connected to corresponding inputs of the logic matrix 4. According to the switching connection selected, the voltages $u_{13}(t)$, $u_{14}(t)$, supplied from movement sensitive transducers 11, and, if desired, amplified and converted, causes a frequency and/or amplitude modulation of the characteristic signal wave form 10 outputted by the associated signal generator 5.

FIG. 4 shows an embodiment using pressure sensitive or "sound" sensors 15 and distortion sensors 16. The sound sensors 15 may, exemplary, be touch sensors or switches whilst the distortion sensors 16 may be a rotational potentiometer. By means of the logic matrix 4 each signal generator 5 provides a characteristic signal 10, for instance corresponding to the voltage/time of the sound of a piano, has associated therewith a sound sensor 15 such that the actuation of the latter causes a trigger pulse $u_{15}$ at the switching input 17 of the signal generator 5. By means of an electronic circuit 18, the amplitude of the signal $u_5$, from the signal generator 5, is maintained constant beginning from the time of occurence of a further signal $u_{16}$ from the distortion sensor 16 as long as signal $u_{16}$ is present. The signal $u_{16}$, from the distortion sensor 16, is applied both to the circuit 18 and the frequency modulation input 13 of the signal generator 5 which causes a frequency variation of the signal $u_5$, provided by the signal generator, in dependence on the signal $u_{16}$.

Figure 5A:
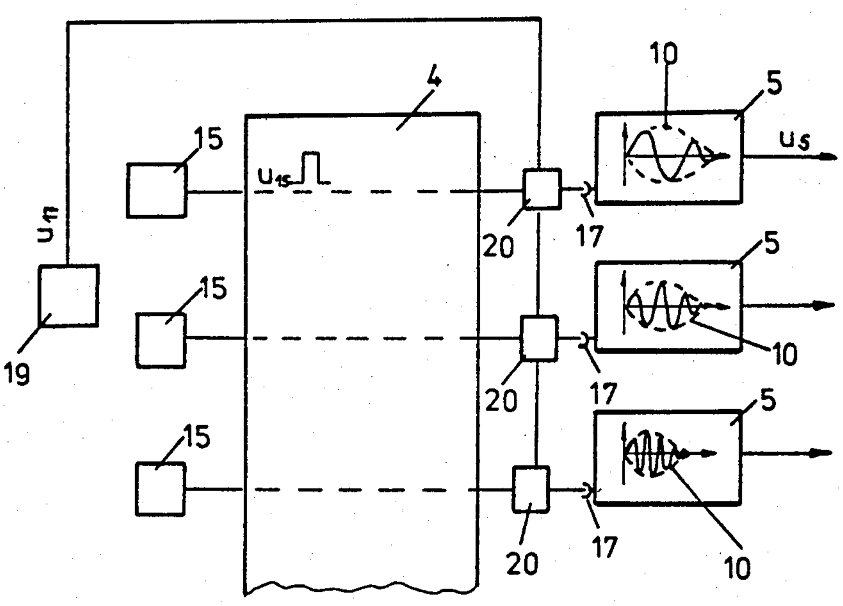
FIG. 5A is a principle block diagram of still another embodiment of the present invention using sound sensors and hold sensors.
Figure 5B:
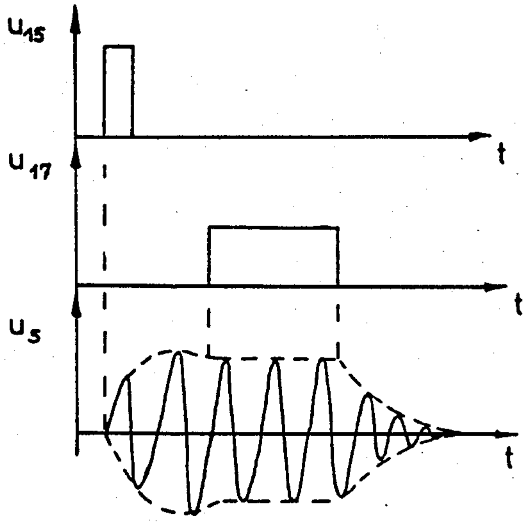
FIG. 5B shows the signal wave forms of the embodiment of FIG. 5A.

FIG. 5 shows a further embodiment using sound sensors 15 and a hold sensor 19.

In this case, an electronic circuit 20 is connected to the switching input 17 of the signal generator 5 which circuit 20 is connected both to the sound sensors 15 and the hold sensor 19. As long as there is no signal $u_{17}$ from the hold sensor 19, this electronic circuit 20, which uses the trigger principle, does not effect the signal $u_5$ from the signal generator 5. This means that, upon actuation of a specific sound sensor 15, a predetermined signal generator 5 provides its characteristic signal 10. However, if, upon actuation of the sound sensor 15, the hold sensor 19 is actuated, its signal $u_{17}$ triggers the circuit 20 which causes the amplitude of the signal $u_5$ of the signal generator 5 being maintained during the presence of signal $u_{17}$ at the circuit 20.

FIG. 6 shows, in an enlarged scale, an embodiment of a sound sensor 15 operating according to the piezoresistive principle. At a cantilever 22, fixedly attached to a housing 23, strain gauges 25 are mounted and change their resistence upon inflection of the cantilever 22. This variation in resistence is converted, by a suitable circuit which uses a power source 24 and an amplifier 2, into a pressure proportional voltage signal $u_{15}(t)$. The top of the housing is closed by a diaphragm 21.

By means of the recent thin film and micro technique, such a unit may be designed smaller than a finger tip.

FIG. 7 shows an embodiment of the present invention using such pressure dependent sound sensors 15. The signal wave forms shown, enhance the understanding of the operation of this embodiment. The sound sensor 15 provides, upon excertion of a force $F_D(t)$, a pressure proportional voltage signal $u_{15}(t)$ which is applied to the logic matrix 4, after eventual amplification and conversion. The logic matrix 4 selects a predetermined signal generator 5, having the characteristic signal wave form 10. The voltage $u_{15}(t)$ forms the envelope of the characteristic signal 10. Thus, a short, high force, excertion on to the sound sensor 15, causes a loud, short sound signal whilst a long and weak force excertion will result in a low, long sound signal.

Figure 8:
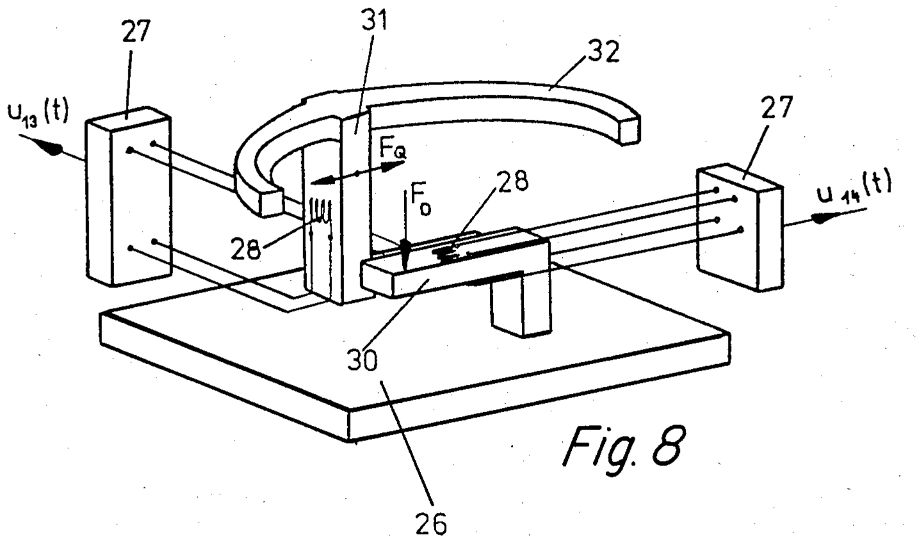
FIG. 8 is a perspective view of an embodiment of a combined sound and distortion sensor operating according to the piezoresistive principle.

FIG. 8 shows a perspective view of a combined sound and distortion sensor unit 26 operating according to the piezoresistive principle.

On a common base, there are provided two flexible beams 30 and 31 arranged perpendicular to each other. Strain gauges 28 are applied to each of the beams 30, 31 which strain gauges are connected to suitable power supply and amplifier units 27. The dimensions of the sound and distortion sensor unit 26 are selected by recent thin film and micro technic such that a finger fits between the bracket 32 and the beam 30. The overall sound and distortion sensor unit 26 is arranged in a housing (not shown) the top of which is closed by a flexible diaphragm (not shown) which ensures free movement of the beams 30, 31.

FIG. 9 is a block diagram of an embodiment using the combined sound and distortion sensor units 26. The pressure proportional voltage $u_{14}(t)$, supplied from the pressure sensitive portion of the sound, and distortion sensor unit 26, after appropriate amplification, is supplied, via the logic matrix 4, to the amplitude modulation input 14 of the associated signal generator 5 providing the desired characteristic signal wave form 10. Similarly, the voltage $u_{13}(t)$, proportional to the lateral force, and supplied from the lateral force portion of the sound and distortion sensor unit 26, is applied to the frequency modulation input 13 of the same signal generator 5. The pressure proportional voltage $u_{14}(t)$ forms the envelope for the signal $u_5(t)$, generated by the signal generator 5 at a predetermined frequency f, whilst the signal $u_{13}(t)$, proportional to the lateral force, causes a proportional frequency variation ($f_i(t)=f(u_{13}(t))$) of the signal $u_5(t)$.

From the preceding description it will be appreciated that, by attaching various types of transducers to the human body, various acoustic and/or visual effects may be created without using complex and voluminous instruments. The transducers may react to various physical phenomena in order to generate electrical signals, preferably, by influence of mechanical forces, for instance pressure, electrical, optical or magnetical influence using variations in resistence, capacitence, reflectivity or magnetic fluxs.

I claim:

1. An instrument for generating at least one of acoustic and visual effects by human body actions comprising:

(a) a plurality of transducer means each adapted to be attached to desired parts of the human body and responsive to accelerations/decelerations caused by a movement thereof to generate electrical signals;

(b) means for producing at least one of said acoustic and visual effects;

(c) a plurality of drive signal generator means for driving said producing means;

(d) logic means connected between said plurality of transducer means and said plurality of drive signal generator means for selectively routing said electrical signals generated by predetermined of transducer means to predetermined of said drive signal generator means.

2. The instrument of claim 1 further comprising a plurality of selecting means attachable to desired parts of the human body for controlling said logic means in order to change said routing of said electrical signals from said plurality of transducer means to said plurality of signal generating generator means.

3. The instrument of claim 1 wherein said transducer means are movement sensitive mechanical transducer means.

4. The instrument of claim 3 wherein said movement sensitive mechanical transducer means is a seismic spring/mass combination in connection with an inductance means.

5. The instrument of claim 1 wherein said transducer means comprises a combination of a pressure sensitive foil and an inertia mass being pressed against said foil under the influence of human body actions.

6. The instrument of claim 1 wherein said signal generator means are provided with at least one of an frequency modulation input and an amplitude modulation input selectable by said logic means.

7. The instrument of claim 6 wherein one of said transducer means is directly connected to said frequency modulation inputs of at least some of said signal generator means the actuation of said one of said transducer means causing a frequency variation of characteristic signals provided by said signal generator means.

8. The instrument of claim 1 wherein there is provided a further one of said tranducer means directly connected to an amplitude modulation input of at least one of said signal generator means.

9. The instrument of claim 1 wherein one of said plurality of transducer means is connected to a hold circuit means having a further input connected to said logic means and an output connected to an input of said signal generator means and holding said electrical signal routed from one said transducer means through said logic means to said signal generator means during the presence of a signal of said one transducer means such that the amplitudes of said electrical signals are maintained constant during this period.

10. The instrument of claim 3 wherein at least part of said plurality of transducer means are potentiometer means.

11. The instrument of claim 2 wherein said selecting means as well as said plurality of said transducer means and said logic means are adapted to be attached to the human skin.

12. The instrument of claim 2 wherein said selecting means as well as said plurality of tranducer means and said logic means are adapted to be provided in at a cloth.

13. The instrument of claim 2 wherein said selecting means as well as said plurality of transducer means and said logic means adapted to be mounted in a lining of a cloth.

14. The instrument of claim 1 further comprising a plurality of pressure sensitive transducer means each adapted to be attached to desired parts of the human body and responsive to pressure exerted thereupon by other parts of the human body said pressure sensitive transducer means being connected to said logic means.

15. An instrument for generating at least one of acoustic and visual effects by human body actions comprising:

(a) a plurality of pressure sensitive transducer means each adapted to be attached to desired parts of the human body and responsive to pressures caused by human body actions;

(b) means for producing at least one of said acoustic and visual effects;

(c) a plurality of drive signal generator means for driving said producing means;

(d) logic means attachable to the human body and connected between said plurality of transducer means and said plurality of the drive signal generator means for selectively routing said electrical signal generated by predetermined of said transducer means to predetermined of said drive signal generator means; and (e) a plurality of selecting means attachable to desired parts of the human body and responsive to human body actions to control said logic means in order to change said routing of said electrical signals from said plurality of transducer means to said plurality of signal generator means.

16. The instrument of claim 15 wherein said pressure sensitive transducer means comprises a pressure sensitive foil.

17. The instrument of claim 15 wherein two of said pressure sensitive transducer means are piezo-electric transducer means and are combined to a unit generating two different electric signals one being proportional to a first force exerted on to it and the other being proportional to a second force exerted perpendicular to the first force onto it.

18. The instrument of claim 17 wherein one of said two electrical signals is applied to an amplitude modulation input of at least one of said signal generator means while the other signal is applied to a frequency modulation input thereof.

19. An instrument for generating at least one of acoustic and visual effects by human body actions comprising:

(a) a plurality of approximation sensitive transducer means each adapted to be attached to desired parts of the human body and responsive to an approximation of parts of the human body;

(b) means for producing at least one of said acoustic and visual effects;

(c) a plurality of drive signal generator means for driving said producing means;

(d) logic means attachable to the human body and connected between said plurality of transducer means and said plurality of the drive signal generator means for selectively routing said electrical signal generated by predetermined of said transducer means to predetermined of said drive signal generator means; and (e) a plurality of selecting means attachable to desired parts of the human body and responsive to human body actions to control said logic means in order to change said routing of said electrical signals from said plurality of transducer means to said plurality of signal generator means.

* * * * *